(12) United States Patent
Achtner

(10) Patent No.: US 6,903,875 B2
(45) Date of Patent: Jun. 7, 2005

(54) HMD DEVICE WITH IMAGING OPTICS COMPRISING AN ASPHERIC SURFACE

(75) Inventor: Bertram Achtner, Schwabisch Gmund (DE)

(73) Assignee: Carl-Zeiss AG, Oberkochen (DE)

( * ) Notice: Subject to any disclaimer, the term of this patent is extended or adjusted under 35 U.S.C. 154(b) by 0 days.

(21) Appl. No.: 10/934,797

(22) Filed: Sep. 3, 2004

(65) Prior Publication Data

US 2005/0046954 A1 Mar. 3, 2005

(30) Foreign Application Priority Data

Sep. 3, 2002 (EP) .............................. 03019980

(51) Int. Cl.$^7$ .................. G02B 27/14; G02B 13/18; G09G 5/00
(52) U.S. Cl. .................. 359/630; 359/637; 359/708; 345/8
(58) Field of Search .................. 359/618, 630–637, 359/643, 708, 716–718, 726, 733–736; 345/7–9

(56) References Cited

U.S. PATENT DOCUMENTS

| | | |
|---|---|---|
| 5,151,823 A | 9/1992 | Chen |
| 5,771,124 A | 6/1998 | Kintz et al. |
| 5,790,312 A | 8/1998 | Togino |
| 5,886,822 A | 3/1999 | Spitzer |
| 5,959,780 A | 9/1999 | Togino et al. |
| 6,023,372 A | 2/2000 | Spitzer et al. |
| 6,055,110 A | 4/2000 | Kintz et al. |
| 6,181,475 B1 | 1/2001 | Togino et al. |
| 6,204,974 B1 | 3/2001 | Spitzer |
| 6,222,676 B1 | 4/2001 | Togino et al. |
| 6,349,004 B1 | 2/2002 | Fischer et al. |

FOREIGN PATENT DOCUMENTS

WO   WO 98/18038   4/1998

OTHER PUBLICATIONS

Warren J. Smith, *Modern Optical Engineering, The Design of Optical Systems: General*, Chapter 12, pp. 412–417 and pp. 428–431, McGraw–Hill, 3rd edition, (Jul. 2000).

Michael D. Missig et al., "Diffractive Optics Applied to Eyepiece Design," *Applied Optics*, vol. 34, No. 14, May 10, 1995 (pp. 2452–2461).

Wayne Knapp et al., "Optical Design Comparison of 60° eyepieces: one with a diffractive surface and one with aspherics," *Applied Optics*, vol. 36, No. 20, Jul. 10, 1997 (pp. 4756–4760).

*Primary Examiner*—Georgia Epps
*Assistant Examiner*—Jack Dinh
(74) *Attorney, Agent, or Firm*—Patterson, Thuente, Skaar & Christensen, P.A.

(57) ABSTRACT

An HMD device is provided, comprising an image element for generating an image and imaging optics projecting the image such that it is perceivable by a user wearing said HMD device, wherein said imaging optics comprise a first optical group including a first lens, which has negative refractive power, and a second lens, which has positive refractive power, a deflecting element arranged following the first optical group as well as a second optical group following the deflecting element, said second optical group comprising a third lens, and wherein, for correction of astigmatism and distortion, at least one surface of the first and second lenses is aspheric and, for correction of the spherical aberration, at least one surface of the third lens is aspheric.

18 Claims, 4 Drawing Sheets

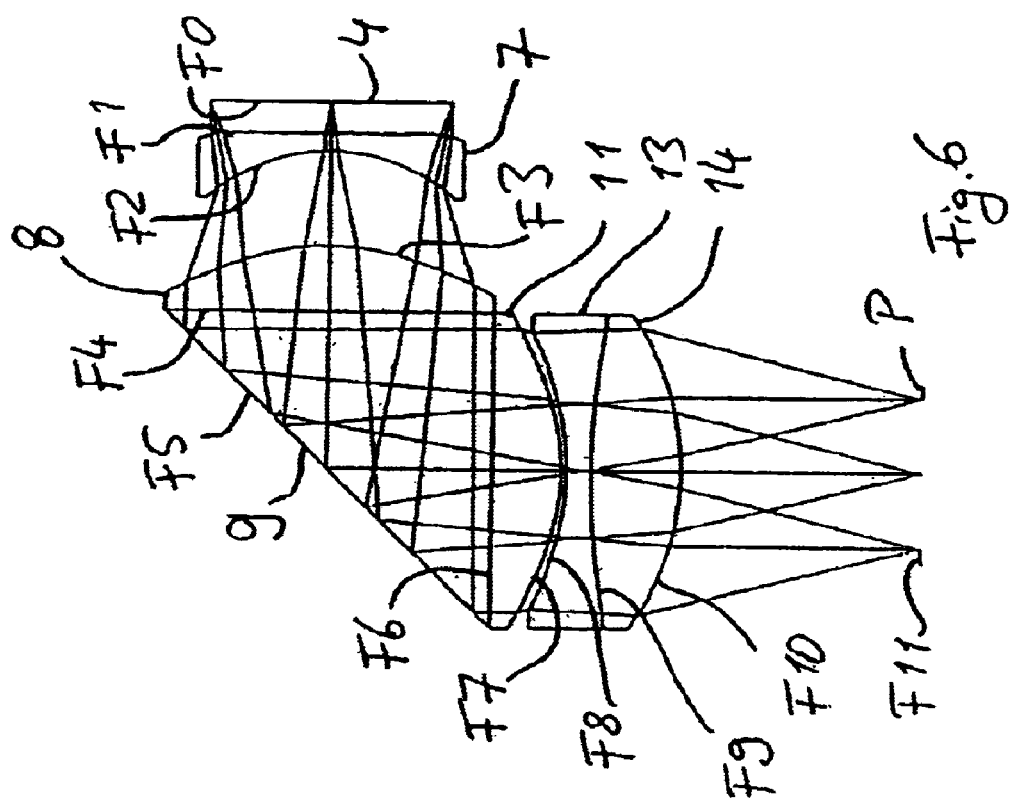

HMD DEVICE WITH IMAGING OPTICS COMPRISING AN ASPHERIC SURFACE

FIELD OF THE INVENTION

The invention relates to an HMD device (Head mounted display device) comprising an image element for generating an image, and imaging optics projecting the image such that it is perceivable by a user wearing said HMD device.

BACKGROUND OF THE INVENTION

Difficulties in connection with such a known HMD device consist in that the exit pupil of the imaging optics has to be located such that the user wearing said HMD device can move his eye to this location, while at the same time, the diameter of the exit pupil has to be sufficiently large so that the user can perceive the entire image even during eye movements. Thus, the diameter of the exit pupil should be at least 8 mm and, at the same time, a field having a size of 25° should be provided, wherein said field and said exit pupil should allow good optical image quality to be realized. Such requirements can be met by providing additional lenses. However, an increase in the number of lenses is disadvantageously connected with an increase in weight and size.

In view thereof, it is an object of the invention to improve an HMD device of the aforementioned type such that excellent imaging quality can be realized, combined with small dimensions and low weight.

SUMMARY OF THE INVENTION

The invention includes an HMD device (Head mounted display device) comprising an image element for generating an image, and imaging optics projecting the image such that it is perceivable by a user wearing said HMD device, wherein said imaging optics comprise a first optical group including a first lens, which has a negative refractive power, and a second lens, which has a positive refractive power, a deflecting element arranged following the first optical group as well as a second optical group following the deflecting element, said second optical group comprising a third lens.

According to the invention, the object is achieved with an HMD device of the aforementioned type in that, for correction of astigmatism and distortion, at least one surface of the first and second lenses is aspheric and, for correction of the spherical aberration, at least one surface of the third lens is aspheric.

Providing an aspheric surface in the first optical group and an aspheric surface in the second optical group is advantageous insofar as this allows the first optical group to realize, above all, correction of astigmatism and distortion, and correction, above all, of the spherical aberration is carried out by means of the second optical group. Thus, correction of the different imaging errors is divided between both optical groups, so that, advantageously, excellent correction and, thus, excellent optical image quality is achieved for the user. With an exit pupil diameter of 8 mm and a field size of 25°, it is possible to realize correction of the spherical aberration of better than ±0.25 dpt, a correction of astigmatism of better than ±0.25 dpt and correction of distortion of better than +5%.

In an advantageous embodiment of the HMD device according to the invention, for correction of curvature of field, the first lens is located closer to the image plane in which the generated image lies than is the second lens and is further located closer to said image plane than to the deflection element. Thus, a very short distance from the first lens to the generated image can be realized, thus achieving excellent correction of the curvature of field.

In the HMD device according to the invention, for correction of transverse chromatic aberration, the material of the first lens may have a higher dispersion than the material of the second lens. Since the first optical group is arranged between the deflecting element and the image plane, the first optical group is relatively close to the image (as compared to the second optical group), which achieves excellent correction of transverse chromatic aberration.

A particularly preferred embodiment of the HMD device according to the invention consists in that, for correction of longitudinal chromatic aberration, the second optical group comprises a diffractive surface and/or an achromat. Since the second optical group is located closer to the exit pupil of the imaging optics than the first optical group, very good correction of longitudinal chromatic aberration can be realized.

Providing a diffractive surface in the second optical group for correction of longitudinal chromatic aberration has the advantage that it is thus not required to provide any additional optical elements. Thus, the diffractive surface can be provided on a surface of the third lens, in particular on the aspheric surface of the third lens. Of course, it is also possible to provide the diffractive surface as a planar surface, which is provided on a thin plane-parallel surface or, if a deflecting prism is provided as the deflecting element, said surface is formed on the side of the deflecting prism facing the second optical group.

The HMD device according to the invention may be further embodied such that one surface of the first lens as well as one surface of the second lens is aspherically designed for correction of astigmatism and distortion. By providing two aspheric surfaces in the first optical group, a further improvement in imaging quality, in particular with a view to correction of astigmatism and distortion, is possible.

An advantageous embodiment of the HMD device according to the invention consists in that the second lens and the third lens are identically designed. This reduces the number of different optical elements, allowing a reduction in manufacturing costs.

The second and third lenses may be arranged such that they are only offset relative to each other along the optical axis or that, in addition, they are also arranged in a mirror image fashion relative to each other.

In the HMD device according to the invention, the deflecting element may cause folding of the optical path about 70°–110°, preferably 90°, by one single reflection. This leads to extremely compact imaging optics, which also allows a small and compact design of the HMD device. As deflecting element, a deflecting prism may be used, for example. This has the advantage that, compared with a deflecting mirror, the prism used as a deflecting element can be made smaller in order to provide the same optical path length (due to the refractive index of the prism material being greater than 1). This leads to a more compact and lighter arrangement.

The use of a deflecting mirror as the deflecting element has the advantage that such a deflecting mirror can be manufactured at extremely low cost with the required precision, which allows the manufacturing costs of the HMD device according to the invention to be reduced.

The HMD device according to the invention may be further embodied such that all optical surfaces of the two optical groups have rotational symmetry and are centered with regard to the optical axis of the imaging optics. Thus, compact imaging optics having excellent imaging properties are provided. In particular, all lenses of the two optical groups can be made of plastics, keeping the weight of the imaging optics very low.

The second optical group preferably has positive refractive power. This allows a compact design of the HMD device.

In particular, the HMD device is provided such that only the generated image is perceivable by the user. Alternatively, the HMD device may be provided for augmented representation, wherein the user perceives the image as superimposed upon the environment. In this case, the ambient light preferably passes through the deflecting element and through the second optical group (and not through the first optical group). The deflecting element may also be preceded by a third optical group, through which the ambient light passes before passing through the deflecting element and the second optical group.

The imaging optics preferably generate a virtual image of the image generated by the image element at infinity.

The exit pupil of the imaging optics is located behind the second optical group (i.e. in air), so that the viewer wearing the HMD device can move his eye to the location of the exit pupil without any problem.

The HMD device according to the invention may, of course, also include a control unit for controlling the image element on the basis of predetermined image data, with the image element either being a luminous image element, e.g. an OLED (organic LED), or a non-luminous image element, which may be reflective or transmissive (e.g. LCD module, tilting-mirror matrix). The image plane in which the image is generated, may be provided by the image element itself or may be spaced apart from the image element. In the latter case, intermediate imaging optics may be arranged between the image element and the image plane. Further, the HMD device according to the invention may also comprise a suitable holding device or a suitable frame, respectively, using which it can be placed on the user's head. This frame may be similar in design to a spectacle frame. Of course, the HMD device may be provided to display an image for one eye or for both eyes, and the image element may generate monochromatic or polychromatic images.

BRIEF DESCRIPTION OF THE DRAWINGS

The invention will be explained in more detail, by way of example, with reference to the Figures, wherein:

FIG. 6 shows a lens section through the imaging optics of the HMD device of FIG. 1 according to a fifth embodiment.

DETAILED DESCRIPTION OF THE INVENTION

Figure 1:
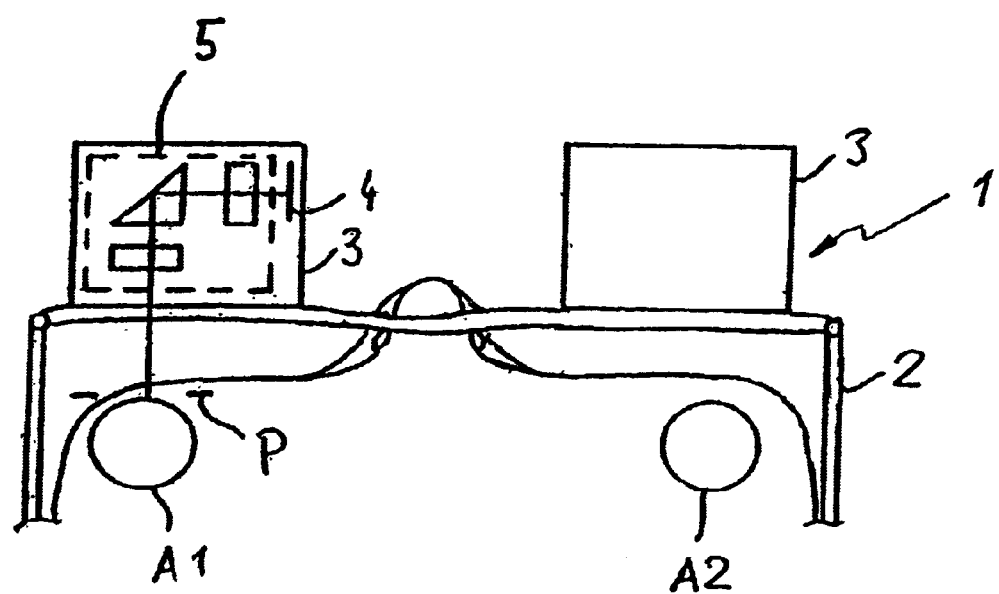
FIG. 1 shows a schematic representation of the HMD device according to the invention.

FIG. 1 shows a schematic view from above onto a user wearing the HMD device 1 according to the invention on his head. The HMD device comprises a spectacle-type frame 2 which is supported on the user's nose as well as on both of his ears (not shown). One image-generating means 3 each is attached to the frame 2 in front of each eye A1, A2 of the user. As shown in FIG. 1 for the left eye A1, the image-generating means 3 comprises an image element 4 which is a luminous microdisplay here, as well as imaging optics 5 by which the image generated by the image element 4 is imaged to infinity such that the user can perceive it with his left eye A1. For this purpose, the exit pupil P of the imaging optics 5 is located in the plane of the pupil of the eye A1.

Figure 2:
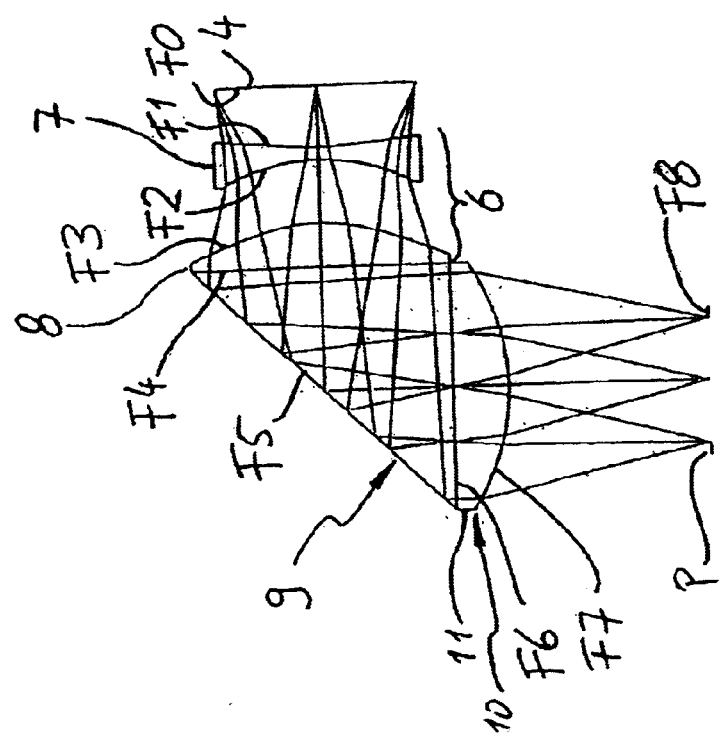
FIG. 2 shows a lens section through the imaging optics of the HMD device of FIG. 1 according to a first embodiment.

FIG. 2 shows an embodiment of the image-generating means 3 in greater detail. Arranged following the image element 4 are, in this order, a first optical group 6, which comprises a first lens 7 having negative refractive power and a second lens 8 having positive refractive power, a 90°-deflecting prism 9 as well as a second optical group 10 comprising a lens 11. In the first optical group, the respective sides of the first and second lenses 7 and 8 facing the image element are provided as aspheric surfaces and the side of the third lens 11 of the second optical group facing the exit pupil P is also provided as an aspheric surface. In addition, the aspheric surface may include a diffractive surface, said diffractive surface having a kinoform profile. In detail, the diffractive surface comprises concentric rings whose center is the lens vertex of the third-lens surface facing the exit pupil. Each ring has an inner and an outer radius. The inner radius of the first ring is zero. The outer radius of the $m^{th}$ ring is the inner radius of the $m^{th}+1$ ring. The width of the rings continuously decreases from the center to the edge of the lens. The groove depth at the inner radius is zero; at the outer radius, it is d. Thus, at the passage from the $m^{th}$ ring to the $m^{th}+1$ ring, there is a step having the height d. The diffractive surface can be described by the following phase profile function $\phi$:

$$\varphi = \frac{2\pi}{\lambda_0} \sum_n C_n r^{2n}$$

wherein $\lambda_0$ is the reference wavelength and $C_n$ are the coefficients of the phase polynomial. The radius r of the $m^{th}$ ring is calculated by $$m\lambda_0 = \sum_n C_n r^{2n} \quad m = 1, 2, 3,$$

there being a maximum of N rings, with $$N = \frac{1}{\lambda_0} \sum_n C_n r^{2n}_{max}$$

wherein $r_{max}$ is half the lens diameter.

The groove depth d at each ring is $$d = \frac{\lambda_0}{n_0 - 1},$$

wherein $n_0$ is the refractive index of the material for $\lambda_0$. It has been shown, for the presently described embodiment, that it was sufficient to describe the diffractive surface by the coefficient $C_1$. Said coefficient is indicated in the following Table 3.

The aspheric surfaces are described by the following formula (sagitta formula):

$$z(h) = \frac{\rho h^2}{1 + \sqrt{1 - (1+K)\rho^2 h^2}} + Ah^4 + Bh^6 + Ch^8$$

z sagitta

K eccentricity

ρ vertex curvature h height

A, B, C coefficients for terms of a higher order.

The detailed optical design of the imaging optics 5 is evident from the following Tables 1 to 4, wherein Table 1 describes the lenses and the deflecting prism, Table 2 specifies the aspheric surfaces and Table 3 specifies the diffractive surface more precisely and Table 4 characterizes the materials used (see "material" column in Table 1).

TABLE 1

| Surface | Surface type | Radius [mm] | Thickness [mm] | Material |
|---|---|---|---|---|
| F0 | | infinite | 5.105 | |
| F1 | aspheric | −21.83491 | 1.000 | POLY |
| F2 | | 15.06187 | 5.103 | |
| F3 | aspheric | 12.42723 | 3.500 | PMMA |
| F4 | | infinite | 10.000 | PMMA |
| F5 | | infinite | 10.000 | PMMA |
| F6 | | infinite | 4.392 | PMMA |
| F7 | aspheric, diffractive | −17.45877 | 15.400 | |
| F8 | | infinite | | |

TABLE 2

| Surface | K | A | B | C |
|---|---|---|---|---|
| F1 | 0.000000 | $0.413518 \times 10^{-3}$ | $-0.444924 \times 10^{-5}$ | $0.180870 \times 10^{-7}$ |
| F3 | 0.000000 | $-0.283785 \times 10^{-3}$ | $0.143310 \times 10^{-5}$ | $-0.853583 \times 10^{-8}$ |
| F7 | 0.000000 | $1.8706 \times 10^{-5}$ | $2.6274 \times 10^{-8}$ | |

TABLE 3

| Surface | $C_1$ | λ [nm] | Order of diffraction | N | $R_1$ [mm] | $R_N$ [mm] | d [mm] |
|---|---|---|---|---|---|---|---|
| F7 | $7.2250 \times 10^{-4}$ | 546.07 | 1 | 132 | 0.8694 | 9.9883 | 0.0011 |

TABLE 4

| Material | $n_d$ | $v_d$ | $\rho_1$ in g/cm³ |
|---|---|---|---|
| PMMA | 1.49178 | 57.99 | 1.19 |
| Poly | 1.59250 | 30.84 | 1.10 |

In Table 4, $n_d$ designates the refractive index at 587.56 nm, $v_d$ is the corresponding Abbe coefficient and $\rho_1$ is the density.

In the embodiment shown in FIG. 2, the second and third lenses 8, 11 are cemented onto the deflecting prism 9. This has the advantage that the complexity of adjustment during manufacture of the imaging optics 5 can be reduced. Thus, the imaging optics as shown merely comprise (only) three lenses and still ensure excellent imaging quality with an exit pupil having a diameter of 10 mm and with a distance of about 15 mm from the exit pupil to the last lens vertex of the third lens 11.

The first optical group serves to correct astigmatism and distortion as well as transverse chromatic aberration. The second optical group, in particular the aspheric diffractive surface F7 of the third lens 11, serves to correct longitudinal chromatic aberration and spherical aberration.

In the embodiment of FIG. 2 and in all subsequent embodiments, the optical groups are provided such that, when designating the focal length of the imaging optics 5 as f, the focal length of the first lens 7 as $f_1$ and the focal length of the second lens as $f_2$, the following relationships hold: $-1.2\ f < f_1 < -0.3\ f$ and $0.6\ f < f_2 < 1.5\ f$. The second optical group has a positive focal length, wherein, when referring to the focal length of the second optical group as $f_3$, the following relationship holds: $0.6\ f < f_3 < 1.7\ f$. As regards the structural length L of the imaging optics from the image element 4 to the exit pupil P (along the optical axis), the following relationships hold, when designating the structural length from the image element 4 to the vertex of the deflecting element 9 as $L_1$ and the structural length from the vertex of the deflecting element 9 to the exit pupil P as $L_2$: $0.6\ f < L_1 < 1.2\ f$. and $0.8\ f < L_2 < 1.5\ f$ and $1.2\ f < L < 2.6\ f$.

Figure 3:
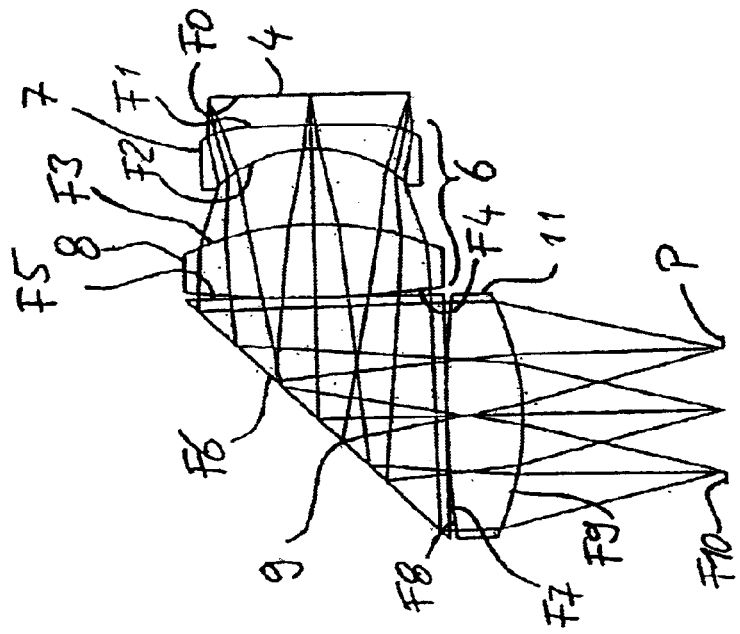
FIG. 3 shows a lens section through the imaging optics of the HMD device of FIG. 1 according to a second embodiment.

FIG. 3 shows a further embodiment of the imaging optics 5, which embodiment differs from the embodiment shown in FIG. 2 in that the second lens 8 and the third lens 11 are identical in design. This reduces the number of the different lenses, so that cost savings are realizable during manufacture. The exact construction of the imaging optics 5 is evident from the following Tables 5 to 7, which are structured in the same manner as Tables 1 to 3.

TABLE 5

| Surface | Surface type | Radius [mm] | Thickness [mm] | Material |
|---|---|---|---|---|
| F0 | | infinite | 2.500 | |
| F1 | aspheric | 116.51036 | 2.000 | POLY |
| F2 | | 10.54987 | 6.182 | |
| F3 | aspheric | 21.50099 | 6.000 | PMMA |
| F4 | diffractive | −87.52364 | 0.050 | |
| F5 | | infinite | 10.000 | PMMA |
| F6 | | infinite | 10.000 | PMMA |
| F7 | | infinite | 0.050 | |
| F8 | diffractive | 87.52364 | 6.000 | PMMA |
| F9 | aspheric | −21.50099 | 15.400 | |
| F10 | | infinite | | |

TABLE 6

| Surface | K | A | B | C |
|---|---|---|---|---|
| F1 | 0.000000 | $-0.166684 \times 10^{-3}$ | $0.569945 \times 10^{-5}$ | $-0.158203 \times 10^{-7}$ |
| F3 | 0.000000 | $-0.193234 \times 10^{-4}$ | $0.365953 \times 10^{-7}$ | $-0.249374 \times 10^{-9}$ |
| F9 | 0.000000 | $0.193234 \times 10^{-4}$ | $-0.365953 \times 10^{-7}$ | $0.249374 \times 10^{-9}$ |

TABLE 7

| Surface | $C_1$ | λ [nm] | Order of diffraction | N | $R_1$ [mm] | $R_N$ [mm] | d [mm] |
|---|---|---|---|---|---|---|---|
| F4 | $-5.3441 \times 10^{-4}$ | 546.07 | 1 | 97 | 1.0108 | 9.9558 | 0.0011 |
| F8 | $-5.3441 \times 10^{-4}$ | 546.07 | 1 | 97 | 1.0108 | 9.9558 | 0.0011 |

Figure 4:
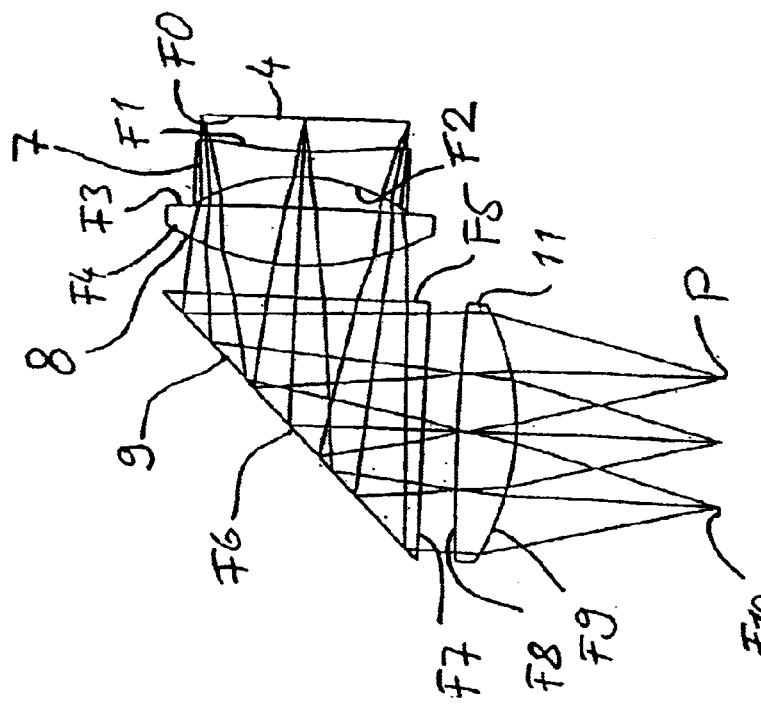
FIG. 4 shows a lens section through the imaging optics of the HMD device of FIG. 1 according to a third embodiment.

FIG. 4 shows a further embodiment of the imaging optics 5, wherein the second lens 8 and the third lens 11 are again identical in design. In contrast to the above-described embodiment 3, both lenses 8 and 11 are arranged merely with an axial offset therebetween, and not in a mirror image fashion relative to each other, as is the case with the embodiment of FIG. 3. Further, the diffractive surface is provided, in the same manner as in the embodiment of FIG. 3, on the aspheric side of the second and third lenses 8 and 11. The exact construction of the imaging optics shown in FIG. 4 is evident from the following Tables 8 to 10.

Figure 5:
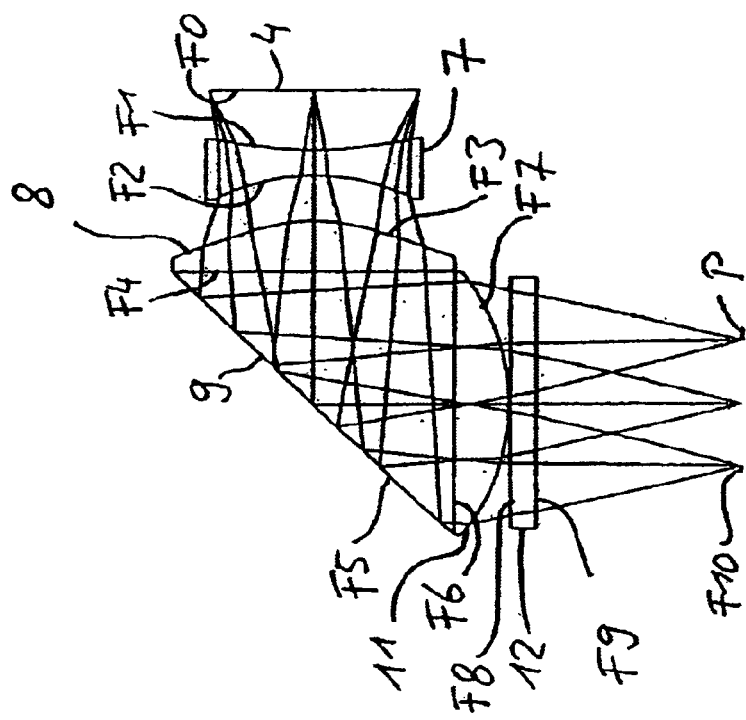
FIG. 5 shows a lens section through the imaging optics of the HMD device of FIG. 1 according to a fourth embodiment.

FIG. 5 shows a further embodiment of the imaging optics 5, wherein, in contrast to the previously described embodiments, the diffractive surface is, in this case, provided on one side of a plane-parallel plate 12. The plane-parallel plate 12 is arranged between the exit pupil P and the third lens 11 of the second optical group 10, and the diffractive surface is provided on the side facing away from the exit pupil P. The second and third lenses are again cemented to the deflecting prism 9. The exact construction of the imaging optics shown in FIG. 5 is evident from the following Tables 11 to 13.

TABLE 8

| Surface | Surface type | Radius [mm] | Thickness [mm] | Material |
|---|---|---|---|---|
| F0 | | infinite | 2.500 | |
| F1 | aspheric | −40.79614 | 2.000 | POLY |
| F2 | | 14.16909 | 2.430 | |
| F3 | diffractive | 175.49822 | 4.500 | PMMA |
| F4 | aspheric | −18.25355 | 2.467 | |
| F5 | | infinite | 10.000 | PMMA |
| F6 | | infinite | 10.000 | PMMA |
| F7 | | infinite | 2.467 | |
| F8 | diffractive | 175.49822 | 4.500 | PMMA |
| F9 | aspheric | −18.25355 | 15.400 | |
| F10 | | infinite | | |

TABLE 11

| Surface | Surface type | Radius [mm] | Thickness [mm] | Material |
|---|---|---|---|---|
| F0 | | infinite | 4.801 | |
| F1 | aspheric | −20.66602 | 2.000 | POLY |
| F2 | | 15.52092 | 3.647 | |
| F3 | aspheric | 11.89860 | 4.000 | PMMA |
| F4 | | infinite | 10.500 | PMMA |
| F5 | | infinite | 10.500 | PMMA |
| F6 | | infinite | 4.000 | PMMA |
| F7 | aspheric | −16.47305 | 0.100 | |
| F8 | diffractive | infinite | 2.000 | PMMA |
| F9 | | infinite | 15.400 | |
| F10 | | infinite | | |

TABLE 9

| Surface | K | A | B | C |
|---|---|---|---|---|
| F1 | 0.000000 | $-0.524123 \times 10^{-4}$ | $0.134643 \times 10^{-5}$ | $0.131270 \times 10^{-7}$ |
| F4 | 0.000000 | $0.135894 \times 10^{-4}$ | $0.172391 \times 10^{-7}$ | $0.953240 \times 10^{-10}$ |
| F9 | 0.000000 | $0.135894 \times 10^{-4}$ | $0.172391 \times 10^{-7}$ | $0.953240 \times 10^{-10}$ |

TABLE 12

| Surface | K | A | B | C |
|---|---|---|---|---|
| F1 | 0.000000 | $0.285342 \times 10^{-3}$ | $-0.213141 \times 10^{-5}$ | $-0.159420 \times 10^{-8}$ |
| F3 | 0.000000 | $-0.329219 \times 10^{-3}$ | $0.136724 \times 10^{-5}$ | $-0.838928 \times 10^{-8}$ |
| F7 | 0.000000 | $0.210164 \times 10^{-4}$ | $-0.264857 \times 10^{-7}$ | $0.421168 \times 10^{-9}$ |

TABLE 10

| Surface | $C_1$ | λ [nm] | Order of diffraction | N | $R_1$ [mm] | $R_N$ [mm] | d [mm] |
|---|---|---|---|---|---|---|---|
| F3 | $-6.3237 \times 10^{-4}$ | 546.07 | 1 | 115 | 0.9293 | 9.9653 | 0.0011 |
| F8 | $-6.3237 \times 10^{-4}$ | 546.07 | 1 | 115 | 0.9293 | 9.9653 | 0.0011 |

TABLE 13

| Surface | $C_1$ | $\lambda$ [nm] | Order of diffraction | N | $R_1$ [mm] | $R_N$ [mm] | d [mm] |
|---|---|---|---|---|---|---|---|
| F8 | $-7.3399 \times 10^{-4}$ | 546.07 | 1 | 134 | 0.8625 | 9.9846 | 0.0011 |

FIG. 6 shows a further embodiment of the imaging optics according to the invention. This embodiment differs from the previously described embodiments in that no diffractive surface is provided in the second optical group 10. Instead a cemented group of two lenses 13 and 14 is utilized having an achromatizing effect. By means of this cemented group longitudinal chromatic aberration is corrected.

The exact structure of the imaging optics is evident from the following Tables 14 and 15.

TABLE 14

| Surface | Surface type | Radius [mm] | Thickness [mm] | Material |
|---|---|---|---|---|
| F0 | | infinite | 2.100 | |
| F1 | aspheric | 47.42856 | 1.200 | POLY |
| F2 | | 11.62924 | 6.300 | |
| F3 | aspheric | 14.46313 | 4.500 | PMMA |
| F4 | | infinite | 10.500 | PMMA |
| F5 | | infinite | 10.500 | PMMA |
| F6 | | infinite | 4.500 | PMMA |
| F7 | aspheric | −14.46313 | 0.300 | |
| F8 | | −19.91802 | 1.500 | POLY |
| F9 | | 54.24851 | 5.819 | PMMA |
| F10 | aspheric | −19.77272 | 15.506 | |
| F11 | | infinite | | |

TABLE 15

| Surface | K | A | B | C |
|---|---|---|---|---|
| F1 | 0.000000 | $-0.587358 \times 10^{-3}$ | $0.956533 \times 10^{-5}$ | $-0.300550 \times 10^{-7}$ |
| F3 | 0.000000 | $-0.100975 \times 10^{-3}$ | $0.150265 \times 10^{-6}$ | $-0.117337 \times 10^{-9}$ |
| F7 | 0.000000 | $0.100975 \times 10^{-3}$ | $-0.150265 \times 10^{-6}$ | $0.117337 \times 10^{-8}$ |
| F10 | 0.000000 | $-0.417928 \times 10^{-4}$ | $0.195818 \times 10^{-6}$ | $-0.435578 \times 10^{-9}$ |

What is claimed is:

1. An HMD device comprising:
an image element to generate an image;
imaging optics projecting the image such that it is perceivable by a user wearing said HMD device, wherein said imaging optics comprise a first optical group including a first lens, having negative refractive power, and a second lens, having positive refractive power and a deflecting element arranged following the first optical group; and
a second optical group following the deflecting element, said second optical group comprising a third lens, wherein, for correction of astigmatism and distortion, at least one surface of the first and second lenses is aspheric and, for correction of the spherical aberration, at least one surface of the third lens is aspheric.

2. The HMD device as claimed in claim 1, wherein, for correction of curvature of field, the first lens is located closer to an image plane in which the generated image lies than is the second lens and the first lens is further located closer to said image plane than to the deflecting element.

3. The HMD device as claimed in claim 2, wherein, to correct transverse chromatic aberration, the first lens is formed of a first material having a higher dispersion than a second material from which the second lens is formed.

4. The HMD device as claimed in claim 1, wherein, to correct transverse chromatic aberration, the first lens is formed of a first material having a higher dispersion than a second material from which the second lens is formed.

5. The HMD device as claimed in claim 1, wherein, to correct longitudinal chromatic aberration, the second optical group comprises a diffractive surface.

6. The HMD device as claimed in claim 5, wherein the diffractive surface is located on the aspheric surface of the third lens.

7. The HMD device as claimed in claim 5, wherein the diffractive surface is a planar surface.

8. The HMD device as claimed in claim 5, in which the diffracting surface has a kinoform profile.

9. The HMD device as claimed in claim 1, wherein, to correct for longitudinal chromatic aberration, the second optical group comprises an achromat.

10. The HMD device as claimed in claim 1, wherein, to correction for astigmatism and distortion, one surface of the first lens and one surface of the second lens is aspherically designed.

11. The HMD device as claimed in claim 1, wherein the second lens and the third lens are identically designed.

12. The HMD device as claimed in claim 1, wherein the deflecting element alters the optical path about seventy degrees to about one hundred ten degrees.

13. The HMD device as claimed in claim 1, wherein the deflecting element alters of the optical path about ninety degrees.

14. The HMD device as claimed in claim 1, wherein the deflecting element alters of the optical path by a single reflection.

15. The HMD device as claimed in claim 1, wherein the two optical groups have optical elements having multiple optical surfaces and each optical element has an optical center and the imaging optics have an optical axis and all of the optical surfaces have rotational symmetry and all of the optical centers coincide with the optical axis of the imaging optics.

16. The HMD device as claimed in claim 1, in which the imaging optics has a focal length f, the first lens has a focal length $f_1$, a second lens has a focal length $f_2$, and
$-1.2 \ f < f_1 < -0.3 \ f$
and
$0.6 \ f < f_2 < 1.5 \ f$.

17. The HMD device as claimed in claim 16, in which second optical group has a focal length $f_3$ and $0.6 \ f < f_3 < 1.7 \ f$.

18. The HMD device as claimed in claim 1, in which the HMD device has a structural length L from the image element to an exit pupil P as measured along an optical axis and the HMD device has a structural length $L_1$ from the image element to a vertex of the deflecting element and structural length $L_2$ from the vertex of the deflecting element to the exit pupil P and
$0.6 \ f < L_1 < 1.2 \ f$
and
$0.8 \ f < L_2 < 1.5 \ f$
and
$1.2 \ f < L < 2.6 \ f$.

* * * * *